United States Patent
Surnilla et al.

(10) Patent No.: US 9,014,947 B2
(45) Date of Patent: Apr. 21, 2015

(54) EXHAUST-GAS REGENERATION UNDER RICH CONDITIONS TO IMPROVE FUEL ECONOMY

(71) Applicant: Ford Global Technologies, LLC, Dearborn, MI (US)

(72) Inventors: Gopichandra Surnilla, West Bloomfield, MI (US); Daniel Joseph Styles, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 271 days.

(21) Appl. No.: 13/660,836

(22) Filed: Oct. 25, 2012

(65) Prior Publication Data

US 2014/0121940 A1 May 1, 2014

(51) Int. Cl.
| | |
|---|---|
| F02D 41/00 | (2006.01) |
| F02M 25/07 | (2006.01) |
| F02D 41/14 | (2006.01) |
| F02D 41/20 | (2006.01) |
| F02D 41/10 | (2006.01) |
| F02B 29/04 | (2006.01) |

(52) U.S. Cl.
CPC .......... *F02M 25/0707* (2013.01); *F02D 41/10* (2013.01); *F02D 41/1446* (2013.01); *F02D 41/0007* (2013.01); *F02D 41/005* (2013.01); *F02B 29/0406* (2013.01); *F02M 25/0709* (2013.01); *F02M 25/0718* (2013.01); *F02M 25/0732* (2013.01); *Y02T 10/144* (2013.01)

(58) Field of Classification Search
CPC ............ F02D 41/0047; F02D 41/0055; F02D 41/0007; F02D 2200/0802; F02D 2041/0265
USPC ........ 701/103, 104, 108; 123/568.12, 568.15, 123/568.21, 568.19, 676, 681
See application file for complete search history.

(56) References Cited

U.S. PATENT DOCUMENTS

| | | | |
|---|---|---|---|
| 5,172,550 A * | 12/1992 | Takeshima | 60/278 |
| 5,278,762 A * | 1/1994 | Kawamura | 701/105 |
| 6,550,445 B2 | 4/2003 | Umezono et al. | |
| 6,813,880 B2 | 11/2004 | Nishiyama et al. | |
| 7,155,332 B2 | 12/2006 | Yamada et al. | |
| 7,356,403 B2 | 4/2008 | Yoshioka et al. | |
| 8,001,779 B2 | 8/2011 | Styles | |
| 2006/0064228 A1 * | 3/2006 | Huang | 701/104 |
| 2007/0039598 A1 * | 2/2007 | Wakayama et al. | 123/568.21 |
| 2009/0288393 A1 * | 11/2009 | Matsuno et al. | 60/286 |
| 2011/0231081 A1 * | 9/2011 | Suzuki et al. | 701/104 |

* cited by examiner

*Primary Examiner* — Mahmoud Gimie
(74) *Attorney, Agent, or Firm* — Julia Voutyras; Alleman Hall McCoy Russell & Tuttle LLP

(57) ABSTRACT

A method for operating a boosted gasoline engine. The method includes diluting an intake air charge of the engine to a first level of dilution when operating at a stoichiometric air-to-fuel ratio. The method also includes, in response to a condition of excessive exhaust temperature downstream of the engine, diluting the intake air charge of the engine to a second, greater level of dilution while operating at an enriched air-to-fuel ratio.

20 Claims, 3 Drawing Sheets

US 9,014,947 B2

EXHAUST-GAS REGENERATION UNDER RICH CONDITIONS TO IMPROVE FUEL ECONOMY

TECHNICAL FIELD

This application relates to the field of motor-vehicle engineering, and more particularly, to exhaust-gas regeneration (EGR).

BACKGROUND AND SUMMARY

An internal combustion engine in a vehicle may operate over a wide range of speed and load. In a boosted gasoline engine operating at a stoichiometric air-fuel ratio, high engine load may result in undesirably high exhaust temperatures. Such temperatures may accelerate materials ageing in the engine system—especially in the turbine and in exhaust-aftertreatment components.

One strategy to reduce the exhaust temperature of a gasoline engine during a high-load transient is to enrich the air-fuel mixture. Above the stoichiometric ratio, liquid fuel injected into an engine cylinder does not contribute to combustion, but to evaporative cooling of the combustion gasses therein. In addition, the excess fuel may be reformed endothermically in the cylinder, providing further cooling. This strategy may erode fuel economy, however, as the excess fuel provides no power.

To address this issue, the inventors herein disclose a series of solutions in which exhaust-gas recirculation is applied aggressively during high-load conditions, while the air-fuel mixture is enriched. One specific embodiment provides a method for operating a boosted gasoline engine. The method includes diluting an intake air charge of the engine to a first level of dilution when operating at a stoichiometric air-to-fuel ratio. The method also includes, in response to a condition of excessive exhaust temperature downstream of the engine, diluting the intake air charge to a second, greater level of dilution while operating at an enriched air-to-fuel ratio.

Certain advantages of EGR in a gasoline engine at high load have been observed previously. U.S. Pat. No. 8,001,779, for example, provides a hybrid high- and low-pressure EGR system, which extends the usefulness of EGR over a wide range of speed and load. This reference recognizes that EGR applied at high load can reduce the need for enrichment to protect exhaust-system components. However, it does not recognize the synergy that may result from the combined use of enrichment and aggressive EGR during high-load transients.

By contrast, the present disclosure demonstrates that application of certain forms of EGR can be used, together with enrichment, as a remedy for the fuel-economy losses that result from enrichment. In this manner, the exhaust-system may be protected during high-load transients, but without undue loss of fuel economy.

The summary above is provided to introduce a selected part of this disclosure in simplified form, not to identify key or essential features. The claimed subject matter, defined by the claims, is limited neither to the content of this summary nor to implementations that address the problems or disadvantages noted herein.

DETAILED DESCRIPTION

Figure 1:
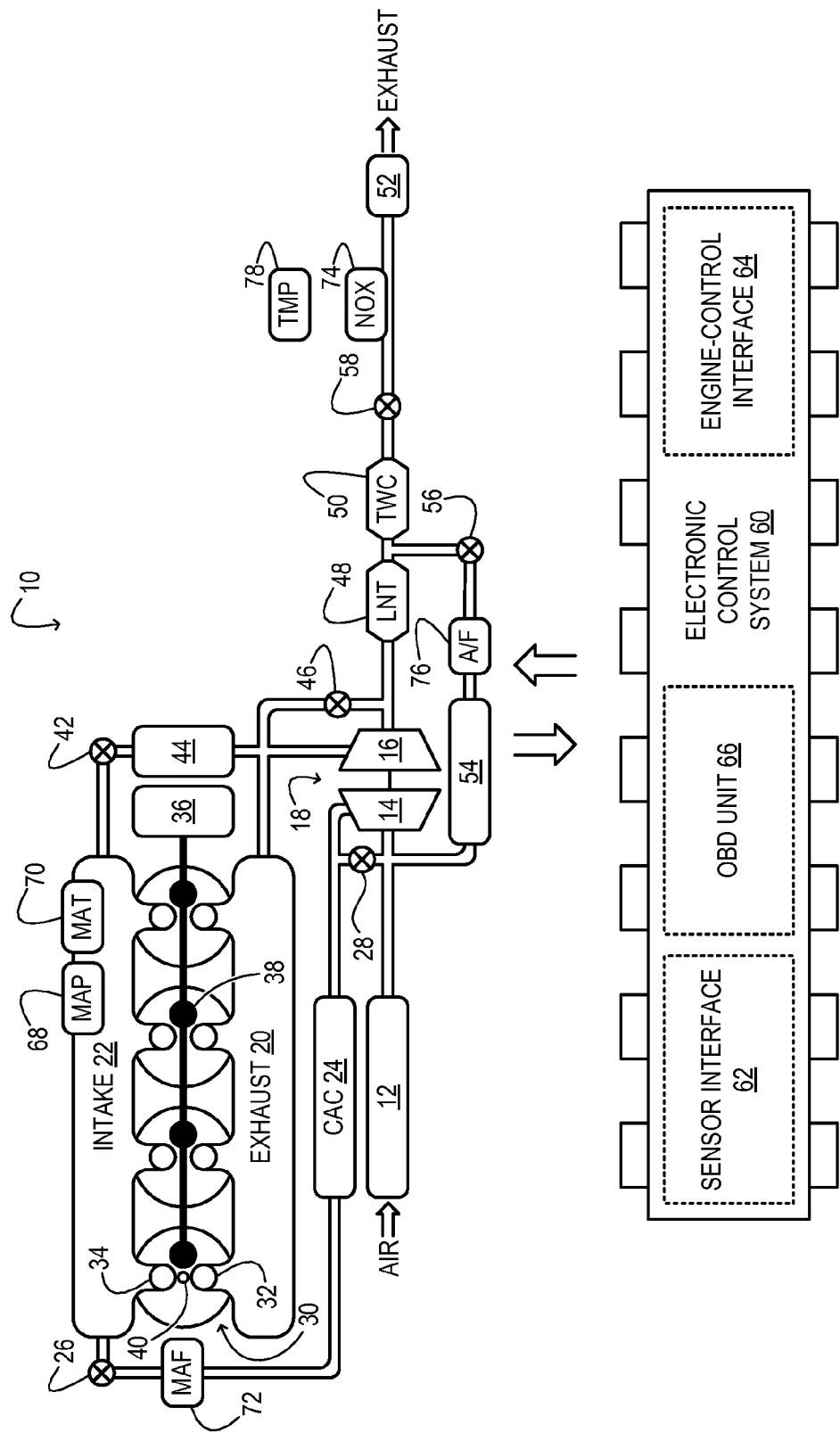
FIG. 1 schematically shows aspects of an example motor-vehicle system in accordance with an embodiment of this disclosure.

FIG. 1 schematically shows aspects of an example engine system 10 of a motor vehicle. In engine system 10, fresh air is inducted into air cleaner 12 and flows to compressor 14. The compressor may be any suitable intake-air compressor—a motor-driven or driveshaft driven supercharger compressor, for example. In engine system 10, however, the compressor is mechanically coupled to turbine 16 in turbocharger 18, the turbine driven by expanding engine exhaust from exhaust manifold 20. In one embodiment, the compressor and turbine may be coupled within a twin scroll turbocharger. In another embodiment, the turbocharger may be a variable geometry turbocharger (VGT), in which turbine geometry is actively varied as a function of engine speed.

Compressor 14 is coupled fluidically to intake manifold 22 via charge-air cooler (CAC) 24 and throttle valve 26. Pressurized air from the compressor flows through the CAC and the throttle valve en route to the intake manifold. In the illustrated embodiment, compressor by-pass valve 28 is coupled between the inlet and the outlet of the compressor. The compressor by-pass valve may be a normally closed valve configured to open to relieve excess boost pressure under selected operating conditions.

Exhaust manifold 20 and intake manifold 22 are coupled to a series of cylinders 30 through a series of exhaust valves 32 and intake valves 34, respectively. In one embodiment, the exhaust and/or intake valves may be electronically actuated. In another embodiment, the exhaust and/or intake valves may be cam actuated. Whether electronically actuated or cam actuated, the timing of exhaust and intake valve opening and closure may be adjusted as needed for desired combustion and emissions-control performance.

Cylinders 30 may be supplied any of a variety of fuels, depending on the embodiment: gasoline, alcohols, or mixtures thereof. In the illustrated embodiment, fuel from fuel pump 36 is supplied to the cylinders via direct injection through fuel injectors 38. In the various embodiments considered herein, the fuel may be supplied via direct injection, port injection, throttle-body injection, or any combination thereof. In engine system 10, combustion is initiated via spark ignition at spark plugs 40. The spark plugs are driven by timed high-voltage pulses from an electronic ignition unit (not shown in the drawings).

Engine system 10 includes high-pressure (HP) exhaust-gas recirculation (EGR) valve 42 and HP EGR cooler 44. When the HP EGR valve is opened, some high-pressure exhaust from exhaust manifold 20 is drawn through the HP EGR cooler to intake manifold 22. In the intake manifold, the high pressure exhaust dilutes the intake-air charge for cooler combustion temperatures, decreased emissions, and other benefits. The remaining exhaust flows to turbine 16 to drive the turbine. When reduced turbine torque is desired, some or all of the exhaust may be directed instead through wastegate 46, by-passing the turbine. The combined flow from the turbine and the wastegate then flows through the various exhaust-aftertreatment devices of the engine system, as further described below.

In engine system 10, lean $NO_x$ trap (LNT) 48 is coupled downstream of turbine 16. The LNT includes an internal catalyst-support structure to which a catalytic washcoat is applied. The washcoat is configured to trap $NO_x$ from the exhaust flow when the exhaust flow is lean, and to reduce the trapped $NO_x$ when the exhaust flow is rich. Three-way catalyst (TWC) stage 50 is coupled downstream of the LNT. The TWC is configured to oxidize residual CO, hydrogen, and hydrocarbons, and to reduce nitrogen oxides ($NO_x$) present in the engine exhaust.

It will be noted that the nature, number, and arrangement of exhaust-aftertreatment stages in the engine system may differ for the different embodiments of this disclosure. For instance, some configurations may include a soot filter or a multi-purpose exhaust-aftertreatment stage that combines soot filtering with other emissions-control functions, such as $NO_x$ trapping.

Continuing in FIG. 1, all or part of the treated exhaust may be released into the ambient via silencer 52. Depending on operating conditions, however, some treated exhaust may be diverted through low-pressure (LP) EGR cooler 54. The exhaust may be diverted by opening LP EGR valve 56 coupled in series with the LP EGR cooler. The LP EGR cooler may include any suitable form of heat exchanger—gas-to-air, gas-to-water, etc. From LP EGR cooler 54, the cooled exhaust gas flows to compressor 14. By partially closing exhaust-backpressure valve 58, the flow potential for LP EGR may be increased during selected operating conditions. Other configurations may include a throttle valve upstream of air cleaner 12 instead of the exhaust back-pressure valve.

Engine system 10 includes electronic control system (ECS) 60 configured to control various engine-system functions. The ECS includes memory and one or more processors configured for appropriate decision making responsive to sensor input and directed to intelligent control of engine-system componentry. Such decision-making may be enacted according to various strategies such as event-driven, interrupt-driven, multi-tasking, multi-threading, and the like. In this manner, the ECS may be configured to enact any or all aspects of the methods disclosed hereinafter. Accordingly, the various method steps—operations, functions, and/or acts—may be embodied as code programmed into machine-readable storage media in the ECS.

ECS 60 includes sensor interface 62, engine-control interface 64, and on-board diagnostic (OBD) unit 66. To assess operating conditions of engine system 10 and of the vehicle in which the engine system is installed, sensor interface 62 receives input from various sensors arranged in the vehicle—flow sensors, temperature sensors, pedal-position sensors, pressure sensors, etc. Some example sensors are shown in FIG. 1—manifold air-pressure (MAP) sensor 68, manifold air-temperature (MAT) sensor 70, mass air-flow (MAF) sensor 72, $NO_x$ sensor 74, exhaust air-to-fuel ratio sensor 76, and exhaust-system temperature sensor 78. In one embodiment, the exhaust-temperature sensor may be thermally coupled to an exhaust-aftertreatment catalyst. Various other sensors may be provided as well.

Engine-control interface 64 is configured to actuate electronically controllable valves, actuators, and other componentry of the vehicle—throttle valve 26, compressor by-pass valve 28, wastegate 46, and EGR valves 42 and 56, for example. The engine-control interface is operatively coupled to each electronically controlled valve and actuator and is configured to command its opening, closure, and/or adjustment as needed to enact the control functions described herein. OBD unit 66 is a portion of the ECS configured to diagnose degradation of various components of engine system 10. Such components may include oxygen sensors, fuel injectors, and emissions-control components, as examples.

The configurations described above enable various methods for operating a boosted gasoline engine. Some such methods are now described, by way of example, with continued reference to the above configurations. It will be understood, however, that the methods here described, and others within the scope of this disclosure, may be enabled by different configurations as well. Naturally, each execution of a method may change the entry conditions for a subsequent execution and thereby invoke a complex decision-making logic. Such logic is fully contemplated in this disclosure.

Figure 2:
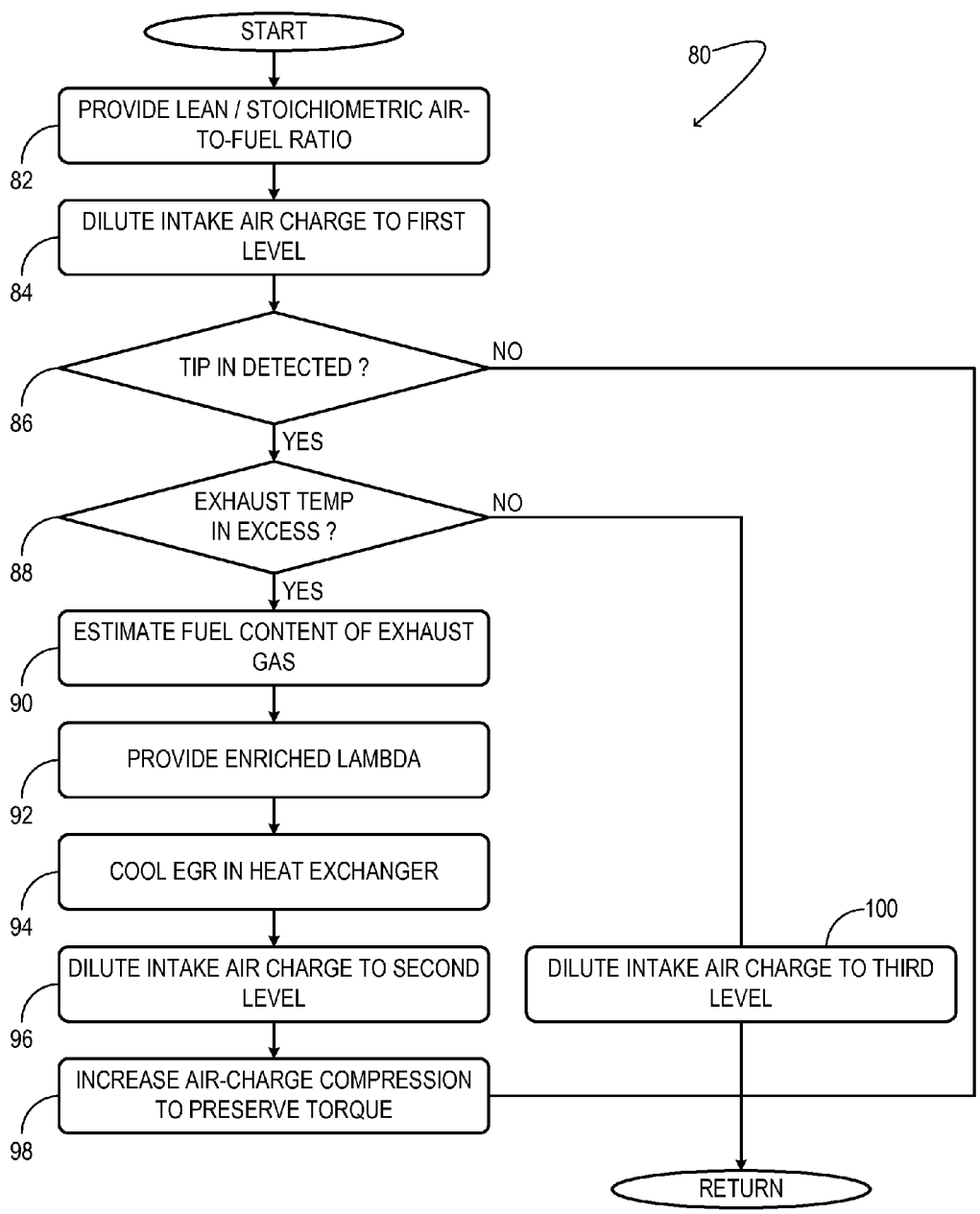
FIG. 2 illustrates an example method for operating a boosted gasoline engine in accordance with an embodiment of this disclosure.

FIG. 2 illustrates an example method 80 for operating a boosted gasoline engine. At 82 of method 80, a lean or stoichiometric air-to-fuel ratio $\lambda$ is provided by adjustment of the fuel injection amount relative to the throttle position, or vice versa. At 84 the intake air charge of the engine is diluted to a first level of dilution via one or more forms of EGR, as further described below.

EGR works by diluting the intake air charge with exhaust gas, thereby reducing its oxygen content. When the resulting air-exhaust mixture is used in place of ordinary air to support combustion in the engine, lower combustion and exhaust temperatures result. EGR can also improve fuel economy in gasoline engines. At medium and high loads, fuel economy is improved due to knock mitigation, allowing for more efficient combustion phasing, reduced heat loss to the engine coolant, and lower exhaust temperatures—which in turn reduce the need for enrichment to cool the exhaust components. At low loads, EGR provides an additional benefit of reducing throttling losses.

As noted above in the context of FIG. 1, exhaust gas may be recirculated through a high pressure (HP) EGR loop and/or a low-pressure (LP) EGR loop. In the HP EGR loop, the exhaust gas is taken from upstream of the turbine and is mixed with intake air downstream of the compressor. In an LP EGR loop, the exhaust gas is taken from downstream of the turbine and is mixed with intake air upstream of the compressor. Further, some engine systems provide so-called 'internal EGR', where combustion in one or more cylinders of the engine may be initiated when exhaust from a previous combustion is still present in the cylinders. The amount of internal EGR may be controlled using variable intake- and/or exhaust-valve timing.

HP and LP EGR strategies achieve optimum efficacy in different regions of the engine load-speed map. Moreover, each strategy presents its own control-system challenges. For example, HP EGR is most effective at low loads, where intake vacuum provides ample flow potential; at higher loads, the desired EGR flow rate may be unattainable due to reduced flow potential. Intrinsically dependent on turbocharger wastegate and throttle conditions, HP EGR may require a complex flow-control strategy. Further, HP EGR may suffer from poor EGR/air-charge mixing and may require a high rate of active cooling due the short length between the HP EGR take-off point and the intake runners of the engine.

In contrast to HP EGR, LP EGR provides adequate flow from mid to high engine loads in areas where HP EGR is flow limited, is more easily cooled, and can be controlled more independently of the throttle and wastegate. Furthermore, cooled LP EGR provides an important additional advantage in scenarios where reduction of exhaust temperature is desired. Prior to re-entry into the cylinder, LP EGR is cooled in the turbine, in the EGR cooler, in the long conduit back to the intake, and again in the CAC. Accordingly, the temperature of the diluent is lower than in HP and internal EGR variants. The lower temperature diluent provides more effective reduction of combustion temperatures and correspondingly lower exhaust temperatures. In the present method, therefore, the intake air charge may be diluted with cooled LP EGR—i.e., diluted upstream of the intake-air compressor with exhaust gas tapped downstream of an exhaust turbine and cooled in a heat exchanger. Nevertheless, other embodiments are envisaged in which HP and/or internal EGR may be used in place of, or in addition to cooled LP EGR.

Continuing in FIG. 2, at 86 it is determined whether a tip in condition is detected. If a tip in condition is detected, then the method advances to 88. However, if no tip in condition is detected, then the method returns. At 88 it is determined whether a condition of excessive exhaust temperature is detected. Excessive exhaust temperature can degrade various exhaust-system components, such as the turbine or an emissions-control catalyst. Accordingly, the condition of excessive exhaust temperature may be detected based on a temperature sensor coupled to a turbine, to an emissions-control component, or elsewhere in the exhaust system.

If a condition of excessive exhaust temperature is detected, then the method advances to 90, where the fuel content of the exhaust gas is estimated. The fuel content may be estimated based on the output of an air-to-fuel ratio sensor coupled to an EGR conduit, for example. From 90, the method advances to 92, where an enriched air-to-fuel ratio is provided to the engine. More specifically, a predetermined amount of enrichment may be provided by increasing the rate of fuel injection into the cylinders, throttle body, or intake manifold of the engine. To correct the injected amount for fuel that may be present in the EGR, the ECS of the engine system may factor in the fuel content of the exhaust, as estimated above.

Enrichment is known to cool the combustion gasses in the cylinders of the engine via evaporative cooling and endothermic reforming reactions. Furthermore, the inventors herein propose that enrichment may increase the EGR tolerance of a gasoline engine operating at high-load conditions. Without tying the present method to any particular theory, it is believed that hydrogen, carbon monoxide, and/or reformed hydrocarbons exhausted from the engine during rich operation can, when reintroduced through the intake, enhance combustion stability even at low oxygen levels. Accordingly, greater levels of dilution can be tolerated during enrichment, for increased fuel economy for the reasons noted hereinabove. For instance, if the EGR tolerance limit of the engine is 15% in stoichiometric operation, it may be 25% during enrichment. In addition to the fuel-economy benefits arising from the extended use of EGR at higher engine load, the present method further improves fuel economy simply by recovering a portion of the unspent fuel that would otherwise be discharged to the ambient or destroyed over an emissions-control catalyst. Thus, the present approach may significantly offset the fuel-economy loss that would otherwise occur during enrichment. It may also reduce hydrocarbon and carbon-monoxide emissions during enrichment and decrease demands on the TWC.

Accordingly, at 94 of method 80, exhaust gas from the engine is cooled in a heat exchanger in anticipation of further dilution of the intake air charge, and at 96, the intake air charge is diluted to a second level of dilution, greater than the first level of dilution provided at 84. More particularly, the ECS may be configured to open an EGR valve in the engine to provide a first level of dilution when operating the engine at a stoichiometric air-to-fuel ratio, and a second, greater level of dilution when operating the engine at an enriched air-to-fuel ratio. In some embodiments, the second level of dilution may be such as to cause combustion instability if used at the stoichiometric air-to-fuel ratio.

In the illustrated method, the intake air charge of the engine is diluted to a greater level of dilution when operating at an enriched air-to-fuel ratio in response to a condition of excessive exhaust temperature downstream of the engine. In particular, the enriched air-to-fuel ratio is provided during a tip-in condition—i.e., a high-load transient. More generally, the stoichiometric air-to-fuel ratio may be provided during a first operating condition, and the enriched air-to-fuel ratio during a second operating condition. The second operating condition may include a higher engine load than the first operating condition. Under such conditions, a concurrent increase in dilution may be expected to improve fuel economy. In other embodiments, the intake air charge may be diluted to the second level of dilution only if such dilution is known or predicted to improve fuel economy.

Continuing in FIG. 2, at 98 the air-charge compression (i.e., boost) is increased to preserve torque while operating at the second level of dilution—e.g., during the tip-in condition. This action may be taken to compensate for the increased dilution rate and resulting reduction in available oxygen. As noted above, the ECS may be configured to operate the engine at the enriched air-to-fuel ratio only when an output of the exhaust temperature sensor indicates an over-temperature condition, at 88 of method 80. If no excessive exhaust temperature is detected, however, the method instead advances to 100, where the intake air charge is diluted to a third level of dilution. In this scenario, no enrichment is provided. Accordingly, the third level of dilution may be lower than the second level of dilution. In some cases, however, it may still be greater than the first level of dilution, owing to the higher engine load during the detected tip in condition.

Figure 3:
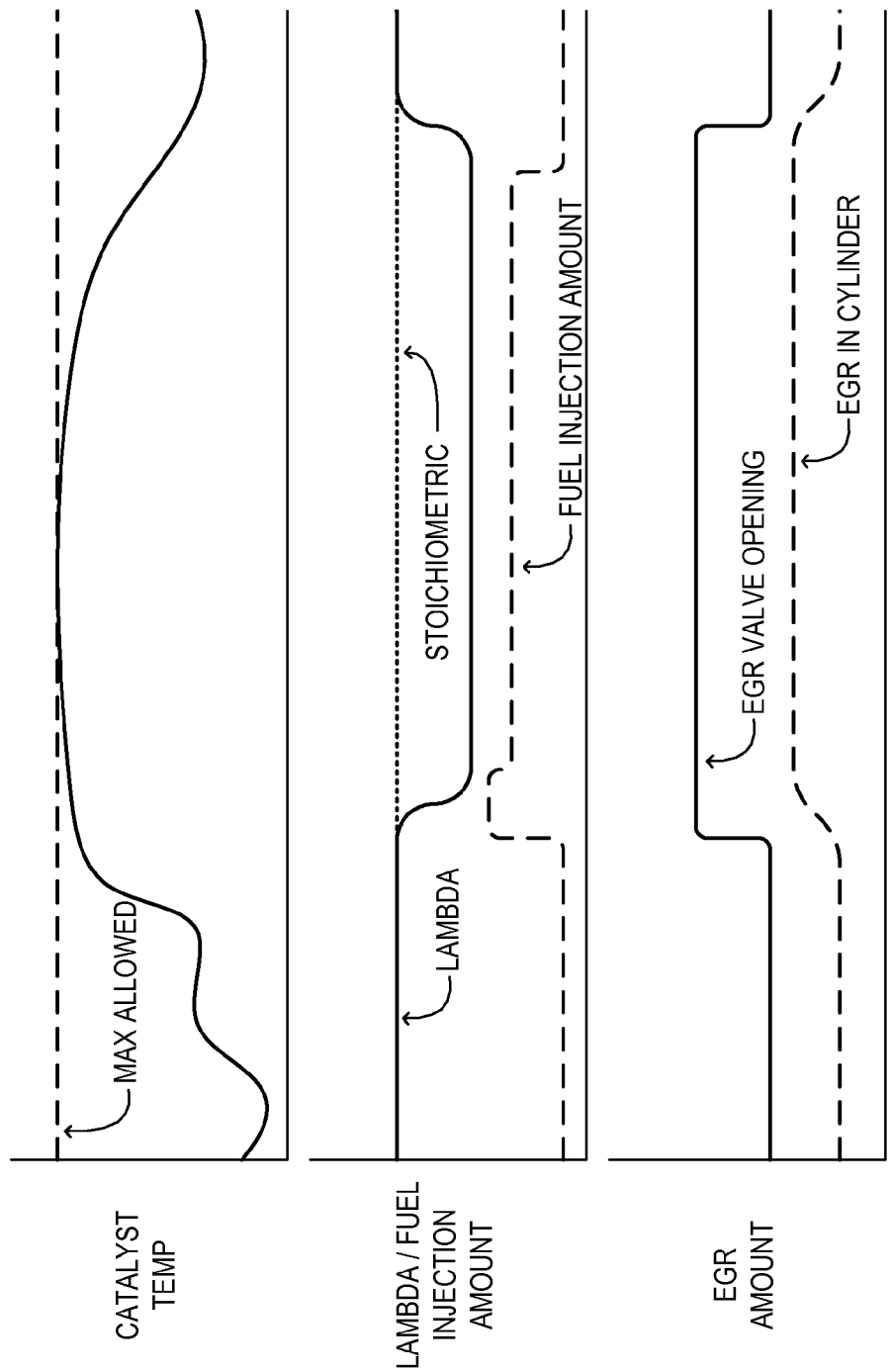
FIG. 3 is an example graphical comparison of certain engine parameters during execution of the method of FIG. 2.

FIG. 3 provides a graphical comparison of certain engine parameters during execution of method 80. The upper graph of FIG. 3 shows an example variation of an emissions-control catalyst temperature with time during a high-load transient. As the catalyst temperature approaches is allowed upper limit, enrichment is initiated to prevent the catalyst temperature from exceeding the upper limit. The desired enrichment is accomplished by increasing the fuel-injection amount as shown in by the dashed line in the middle graph of FIG. 3. In the illustrated embodiment, a high initial stage of fuel-injection increase is followed by a lower plateau that persists through the enrichment period. On the plateau, enrichment results from increased fuel injection combined with the return of unspent fuel to the intake via the EGR loop. In the initial stage, however, little or no unspent fuel may be present in the EGR loop, so an even greater level of fuel injection is provided. This strategy may be used to provide a relatively constant in-cylinder air-to-fuel ratio during enrichment, as shown by the solid line in the middle graph. Continuing in FIG. 3, the lower graph shows the EGR valve opening amount in the solid line and the resulting in-cylinder EGR dilution level in the dashed line.

Aspects of this disclosure are set forth by example, with reference to the illustrated embodiments described above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

In the methods illustrated and/or described herein, some of the indicated process steps may be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

It will be understood that the articles, systems, and methods described hereinabove are embodiments of this disclosure—non-limiting examples for which numerous variations and extensions are contemplated as well. This disclosure also includes all novel and non-obvious combinations and subcombinations of the above articles, systems, and methods, and any and all equivalents thereof.

The invention claimed is:

1. A method for operating a boosted gasoline engine, the method comprising:
    diluting an intake air charge of the engine to a first level of dilution within a first dilution tolerance limit when operating at a stoichiometric air-to-fuel ratio; and
    diluting the intake air charge of the engine to a second, greater level of dilution within a second, greater dilution tolerance limit while operating at an enriched air-to-fuel ratio, in response to a condition of excessive exhaust temperature downstream of the engine.

2. The method of claim 1 wherein the intake air charge is diluted to the second level of dilution only if such dilution improves fuel economy.

3. The method of claim 1 wherein the enriched air-to-fuel ratio is provided during a tip-in condition.

4. The method of claim 3 further comprising increasing compression of the intake air charge to preserve torque during the tip-in condition.

5. The method of claim 1 wherein diluting the intake air charge includes diluting upstream of an intake-air compressor with exhaust gas trapped downstream of an exhaust turbine, the turbine mechanically coupled to a compressor.

6. The method of claim 5 further comprising cooling the exhaust gas in a heat exchanger prior to dilution of the intake air charge.

7. The method of claim 1 wherein the second level of dilution is such as to cause combustion instability if used at the stoichiometric air-to-fuel ratio.

8. The method of claim 1 wherein the stoichiometric air-to-fuel ratio is provided during a first operating condition, and wherein the enriched air-to-fuel ratio is provided during a second operating condition, the second operating condition including a higher engine load than the first operating condition.

9. The method of claim 8 further comprising diluting the intake air charge to a third level of dilution, lower than the second, during a third operating condition, wherein a catalyst temperature downstream of the engine is cooler in the third operating condition than in the second operating condition, but engine load is substantially the same.

10. The method of claim 1 wherein the intake air charge is diluted with exhaust gas, the method further comprising estimating a fuel content of the exhaust gas.

11. The method of claim 10 further comprising adjusting an amount of fuel injected into the engine based on the estimated fuel content of the exhaust gas.

12. A gasoline engine comprising:
    an intake-air compressor fluidically coupled to an intake manifold;
    an exhaust turbine fluidically coupled to an exhaust manifold and mechanically coupled to the compressor;
    a conduit having an inlet coupled downstream of the turbine, an outlet coupled upstream of the compressor, and a valve to regulate exhaust flow through the conduit to adjust a level of intake-air dilution in the intake manifold; and
    a controller configured to open the valve to provide a first level of dilution within a first dilution tolerance limit when operating the engine at a stoichiometric air-to-fuel ratio, and a second, greater level of dilution within a second, greater dilution tolerance limit when operating the engine at an enriched air-to-fuel ratio.

13. The engine of claim 12 further comprising a heat exchanger thermally coupled to the conduit and configured to cool the exhaust therein.

14. The engine of claim 12 further comprising an air-to-fuel ratio sensor arranged in the conduit and operatively coupled to the controller.

15. The engine of claim 12 further comprising an exhaust-temperature sensor.

16. The engine of claim 15 wherein the exhaust-temperature sensor is thermally coupled to an exhaust-aftertreatment catalyst.

17. The engine of claim 15 wherein the controller is further configured to operate the engine at the enriched air-to-fuel ratio only when an output of the exhaust temperature sensor indicates an over-temperature condition.

18. A method for operating a boosted gasoline engine, the method comprising:
    providing a lean or stoichiometric air-to-fuel ratio;
    diluting an intake air charge of the engine to a first level of dilution within a first dilution tolerance limit;
    detecting a condition of excessive exhaust temperature; and
    in response to the condition of excessive exhaust temperature, providing an enriched air-to-fuel ratio and diluting the intake air charge of the engine to a second, greater level of dilution within a second, greater dilution tolerance limit.

19. The method of claim 18 further comprising increasing the compression of the intake air charge to preserve torque while operating at the second level of dilution.

20. The method of claim 19 wherein the enriched air-to-fuel ratio is provided during a tip-in condition.

* * * * *